(12) United States Patent
Shirai

(10) Patent No.: US 6,492,806 B2
(45) Date of Patent: Dec. 10, 2002

(54) MAGNETIC ENCODER AND SURVEY INSTRUMENT HAVING MAGNETIC ENCODER

(75) Inventor: Masami Shirai, Saitama (JP)

(73) Assignee: Pentax Corporation, Tokyo (JP)

( * ) Notice: Subject to any disclaimer, the term of this patent is extended or adjusted under 35 U.S.C. 154(b) by 0 days.

(21) Appl. No.: 09/879,162

(22) Filed: Jun. 13, 2001

(65) Prior Publication Data

US 2002/0005716 A1 Jan. 17, 2002

(30) Foreign Application Priority Data

Jun. 14, 2000 (JP) ........................... 2000-178306

(51) Int. Cl.$^7$ .................... G01B 7/30; G01R 33/025
(52) U.S. Cl. ...................... 324/207.12; 324/207.21; 324/207.25; 33/1 PT; 341/15
(58) Field of Search ............... 324/207.21, 207.25, 324/207.12; 33/1 N, 1 PT, 281, 282, 285, 290, 291; 341/15

(56) References Cited

U.S. PATENT DOCUMENTS

| | | | | |
|---|---|---|---|---|
| 5,019,776 A | * | 5/1991 | Kawamat et al. | 324/207.12 |
| 5,036,276 A | * | 7/1991 | Aizawa | 324/207.21 |
| 6,018,881 A | * | 2/2000 | Spies | 33/706 |
| 6,246,233 B1 | * | 7/2001 | Griffen et al. | 324/207.21 |
| 6,259,249 B1 | * | 7/2001 | Miyata | 324/207.17 |

FOREIGN PATENT DOCUMENTS

JP      63-6418      1/1988

\* cited by examiner

*Primary Examiner*—Edward Lefkowitz
*Assistant Examiner*—Darrell Kinder
(74) *Attorney, Agent, or Firm*—Greenblum & Bernstein, P.L.C.

(57) ABSTRACT

A magnetic incremental encoder includes a plurality of detection devices which are provided on an outer periphery of a rotational member at a predetermined phase difference, wherein each of the detection devices outputs signals which vary periodically in accordance with the rotational angle of the rotational member upon rotation thereof; wherein the plurality of detection devices are provided in sets of two detection devices on the outer periphery of the rotational member, wherein a phase difference between one of the sets of two detection devices and an adjacent another of the sets of two detection devices is determined according to the following formula:

$$2\pi P + \pi/j;$$

wherein P designates an arbitrary integer; and j designates one of the number of k orders, wherein k designates the number of orders of harmonic distortions to be corrected. The number of the plurality of detection devices is equal to $2^k$.

10 Claims, 6 Drawing Sheets

MAGNETIC ENCODER AND SURVEY INSTRUMENT HAVING MAGNETIC ENCODER

BACKGROUND OF THE INVENTION

1. Field of the Invention

The present invention relates to a magnetic incremental encoder, and in particular, relates to a magnetic incremental encoder suitable for a survey instrument, such as a total station or theodolite.

2. Description of the Related Art

In a known survey instrument, such as a total station or theodolite, a magnetic incremental encoder is provided as an angle measuring device. The magnetic incremental encoder is provided with a magnetic drum which rotates together with a collimating telescope, and a magnetic sensor which detects the angular displacement of the magnetic drum. The magnetic drum is provided on its outer peripheral surface with a multipolar magnetization layer which is divided into T magnetized sections (T is a positive integer) arranged at an equal pitch. The magnetic sensor is opposed to the multipolar magnetization layer. The magnetic sensor is provided with, for example, four magnetoresistor elements which are spaced at a distance smaller than the pitch of the magnetized sections of the multipolar magnetization layer. Consequently, the angular displacement of the magnetic drum is detected with an accuracy depending on the pitch of the magnetized sections, by detecting the reluctance of the magnetoresistor elements which varies in accordance with the rotation of the magnetic drum. An angle smaller than that corresponding to one pitch is determined by interpolation calculation.

For a survey instrument, the deviation of a protractor is specified by JIS (Japanese Industrial Standard) regulations, or the like. Accordingly, in a high precision survey instrument, two magnetic sensors are diametrically opposed to each other by 180 degrees, so that an arithmetic mean of the detection values of the two sensors is obtained to correct the eccentricity.

However, in case of a magnetic incremental encoder, the dividing number of the magnetized sections of the multipolar magnetization layer is smaller than that of an optical encoder, thus resulting in an increased pitch of the magnetized sections, and hence an influence of a harmonic error (harmonic distortion) within one pitch of the split sections is enhanced due to a dimensional error or deviation of magnetoresistor curves of the magnetoresistor elements from an ideal curve.

SUMMARY OF THE INVENTION

It is an object of the present invention to provide a magnetic incremental encoder suitable for a survey instrument, in which a plurality of harmonic distortions of an $n^{th}$ order (n is an optional integer) can be corrected simultaneously.

To achieve the object mentioned above, according to an aspect of the present invention, a magnetic incremental encoder including a plurality of detection devices which are provided on an outer periphery of a rotational member at a predetermined phase difference, wherein each of the detection devices outputs signals which vary periodically in accordance with the rotational angle of the rotational member upon rotation thereof; wherein the plurality of detection devices are provided in sets of two detection devices on the outer periphery of the rotational member, wherein a phase difference between one of the sets of two detection devices and an adjacent another of the sets of two detection devices is determined according to the following formula:

$2\pi P + \pi/j$; wherein P designates an arbitrary integer; and j designates one of the number of k orders, wherein k designates the number of orders of harmonic distortions to be corrected. The number of the plurality of detection devices is equal to $2^k$.

Preferably, the magnetic incremental encoder further includes a calculation device which calculates an arithmetic mean of the detection signals of the plurality of detection devices to obtain a detection angle whose harmonic distortions of k order have been corrected.

In order to correct k number of different order harmonic distortions, the phase difference between one of the sets of two detection devices and an adjacent another of the sets of two detection devices is determined by the above formula at a first order of j order of the number of k orders, wherein the one of the sets of two detection devices and the adjacent another of the sets of two detection devices constitute a group of detection devices.

Furthermore, the phase difference between one group of detection devices and an adjacent another group of detection devices of the plurality of detection devices is obtained by the formula at a j order other than said first order, of the number of k orders.

In order to correct $n^{th}$ order and $m^{th}$ order harmonic distortions, two sets of detection devices are provided; each set of detection devices including two detection devices, each detection device of the two sets of detection devices being arranged with a phase difference determined by one of the following formulae:

$2\pi P_1 + \pi/n$; and $2\pi P_2 + \pi/n$;

wherein $P_1$ and $P_2$ are arbitrary integers. Each set of detection devices are arranged with a phase difference determined by the following formula:

$2\pi P_3 + \pi/m$;

wherein $P_3$ is an arbitrary integer.

The rotary member is rotatably supported by a stationary portion of a device on which the magnetic incremental encoder is mounted, and the rotary member being provided on the outer peripheral surface thereof with a multipolar magnetization layer having split sections magnetized at an equal pitch of $\lambda$; the detection devices being provided with magnetic sensors mounted to the stationary portion and opposed to the multipolar magnetization layer of the magnetic drum.

The magnetic sensors are each provided with eight magnetoresistor elements arranged with a phase difference of $\lambda/4$ to detect the magnetic field which varies in accordance with the rotation of the magnetic drum. A detection signal is produced in accordance with the rotation angle of the magnetic drum, based on the detection outputs of four magnetoresistor elements which are deviated by $\lambda/2$ and the detection outputs of the remaining four magnetoresistor elements which are deviated by $\lambda/2$.

The calculation device can calculate the arithmetic mean of the rotation angles detected by all the magnetic sensors to obtain a rotation angle of the magnetic drum.

It is possible to provide additional detection devices, which have the same arrangement and number as the plurality of detection devices, are provided diametrically and symmetrically opposed to the plurality of detection devices, with respect to the center of rotation of the rotational member.

According to another aspect of the present invention, a survey instrument is provided having a magnetic incremental encoder including a plurality of detection devices which are provided on an outer periphery of a rotational member at a predetermined phase difference, wherein each of the detection devices outputs signals which vary periodically in accordance with the rotational angle of the rotational member upon rotation thereof; wherein the plurality of detection devices are provided in sets of two detection devices on the outer periphery of the rotational member, wherein a phase difference between one of the sets of two detection devices and an adjacent another of the sets of two detection devices is determined according to the following formula:

$2\pi P+\pi/j$; wherein P designates an arbitrary integer; and j designates one of the number of k orders, wherein k designates the number of orders of harmonic distortions to be corrected. The number of the plurality of detection devices is equal to $2^k$. The magnetic incremental encoder constitutes at least one of a vertical and horizontal protractor.

The present disclosure relates to subject matter contained in Japanese Patent Application No. 2000-178306 (filed on Jun. 14, 2000) which is expressly incorporated herein by reference in its entirety.

BRIEF DESCRIPTION OF THE DRAWINGS

The invention will be discussed below with reference to the accompanying drawings, in which.

DESCRIPTION OF THE PREFERRED EMBODIMENT

Figure 1:
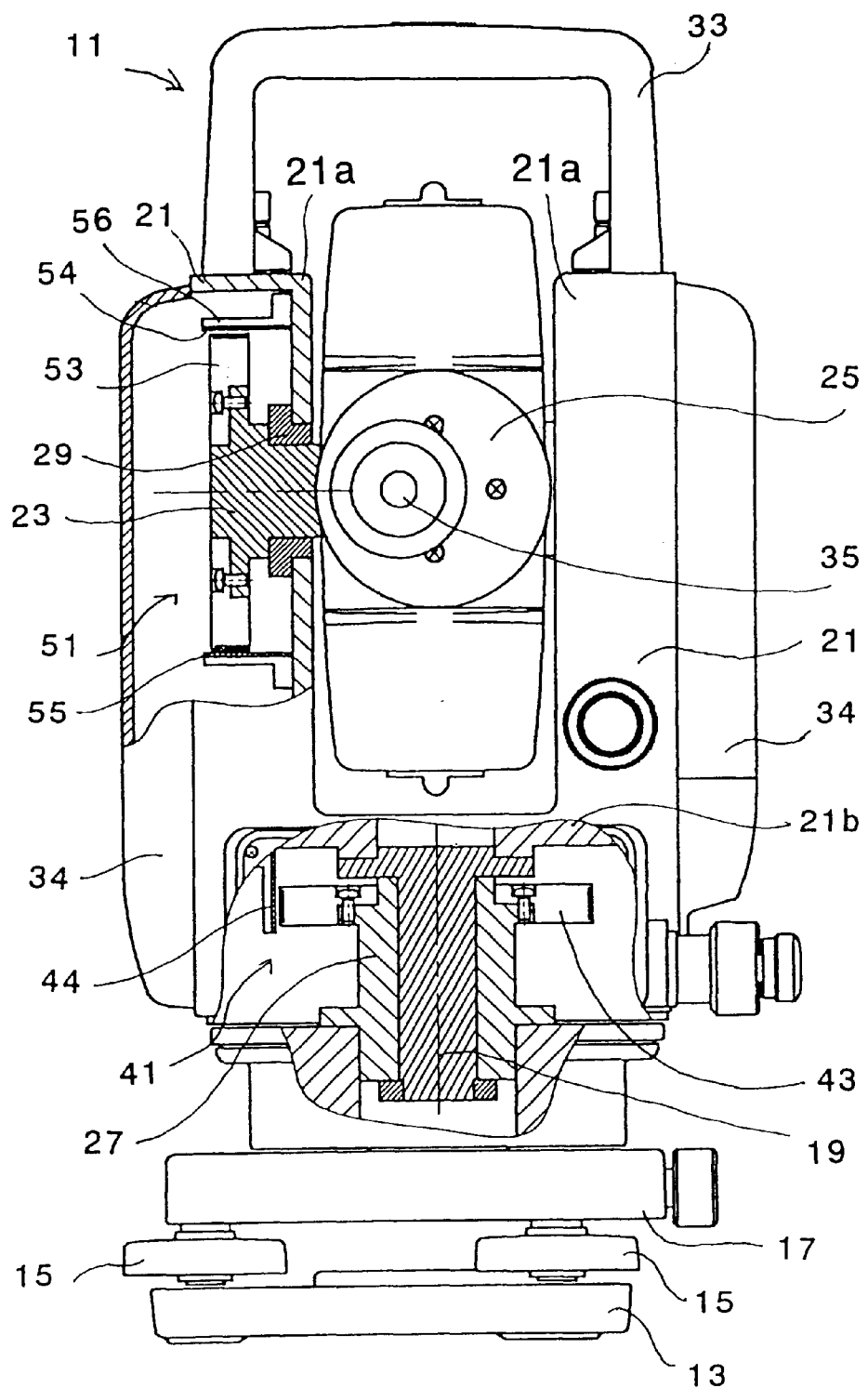
FIG. 1 is a partially broken rear view of a total station having a magnetic incremental encoder showing the magnetic incremental encoder, according to the present invention.
Figure 2:
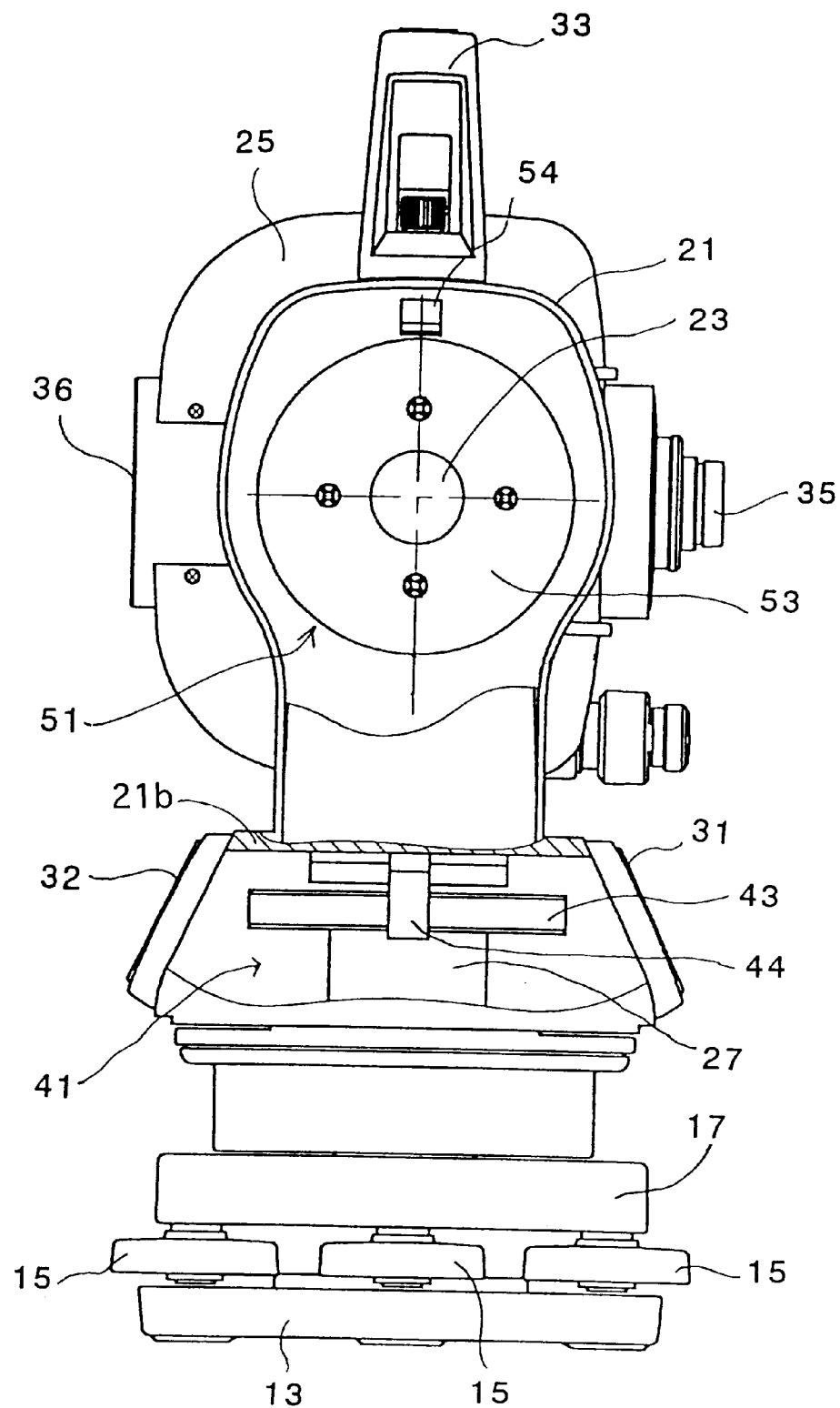
FIG. 2 is a partially broken side view of a total station to show main parts of a total station, according to the present invention.

FIG. 1 is a partially broken rear view of a total station having a magnetic incremental encoder according to the present invention, in which the internal magnetic incremental encoder is shown. FIG. 2 is a partially broken side view of a total station having a magnetic incremental encoder, according to the present invention, in which the internal magnetic incremental encoder is shown.

The total station 11 is provided with a base plate 13, a leveling board 17, a pedestal (body/stationary member) 21 and a collimating telescope 25. The base plate 13 is connected to a tripod (not shown) when the total station 11 is mounted on the tripod. The base plate 13 is provided thereon with three leveling screws 15 on which the leveling board 17 is mounted. The pedestal 21 is mounted on the leveling board 17 via a vertical shaft 19 to be rotatable about the vertical shaft 19. The pedestal 21 is formed so as to have a general U-shaped cross section, and has a pair of supports 21a positioned on right and left sides as viewed in FIG. 1. The collimating telescope 25 is held by the pair of supports 21a therebetween to be rotatable about the axis of a pair of coaxial horizontal shafts 23 which are respectively fixed to the right and left sides of the collimating telescope 25 as viewed in FIG. 1. The pair of coaxial horizontal shafts 23 are respectively supported by the pair of supports 21a to be rotatable about the axis thereof. In FIG. 1 only one of the pair of coaxial horizontal shafts 23 (the left shaft 23 as viewed in FIG. 1) is shown (in cross section).

The vertical shaft 19 is rotatably fitted in and supported by a vertical bearing 27 which is fixed to the leveling board 17. The pedestal 21 is provided with a base portion 21b to which the support posts 21a are connected and which is secured to the upper end of the vertical shaft 19, so as to rotate together with the vertical shaft 19. The horizontal shafts 23 are rotatably supported by horizontal shaft bearings 29 secured to the support posts 21a of the pedestal 21. Thus, the collimating telescope 25 is supported by the pedestal 21 via the horizontal shafts 23 so as to rotate in the vertical direction and is supported by the leveling plate 17 via the pedestal 21 and the vertical shaft 19 to rotate in the azimuth direction.

A magnetic incremental encoder 41 is provided around the vertical shaft 19 as a horizontal protractor to measure the rotation angle (azimuth angle) of the vertical shaft 19 (pedestal 21, collimating telescope 25) relative to the leveling plate 17. A magnetic incremental encoder 51 is provided around the horizontal shaft 23 as a vertical protractor to measure the rotation angle (elevation angle) of the horizontal shaft 23 (collimating telescope 25) relative to the pedestal 21. The magnetic incremental encoders 41, 51 are provided with magnetic drums (rotational members) 43, 53 secured to the shafts 19, 23, and magnetic sensor units 44, 54 which are opposed to and slightly spaced from the multipolar magnetization layers formed on the outer peripheral surface of the magnetic drums 43, 53 at a predetermined distance.

An electronic circuit 61 (FIG. 4) including a signal processor device, an arithmetic operation device (not shown) and an calculation device 61a to determine the rotation angles of the magnetic incremental encoders 41 and 51, i.e., the elevation angle and azimuth angle, in accordance with the output signals of the magnetic sensor units 44 and 54, is provided on the base portion 21b of the pedestal 21. Operation panels 31 and 32 having key boards which are used to operate and control the total station 11, and displays in which reference data input using the key boards and distance measurements, etc., are indicated, are provided on the front and rear surfaces of the pedestal 21 (FIG. 2).

As shown in FIGS. 1 and 2, a hand grip 33 is provided on the total station 11, which can be held by an operator in order to carry the total station. A dustproof cover 34 is attached to the pedestal 21 to protect the magnetic incremental encoder 41 and a battery (not shown), etc. The collimating telescope 25 is provided with an eyepiece 35 and an objective lens 36.

The structure of the magnetic incremental encoder in the illustrated embodiment of the present invention will be discussed below with reference to FIGS. 3 and 4.

Since the basic structures of the magnetic incremental encoders 41 and 51 are the same, the following explanation will be given only for the magnetic sensor 54 of the magnetic incremental encoder 51. FIG. 3 is an enlarged view showing the relationship between each magnetic sensor of the magnetic sensor unit 54 of the magnetic incremental encoder 51 and the multipolar magnetization layer 53a, and FIG. 4 is a circuit diagram showing electrical connection of the magnetoresistor elements of the magnetic sensor. The magnetic sensor unit 54 is secured to an angle member 56 (FIG. 1) which is in turn secured to the pedestal 21. In the illustrated embodiment, the magnetic sensor unit 54 is provided with a plurality of identical magnetic sensors (detection devices) 541 through 544 (FIG. 5). Each magnetic sensor 541 through 544 outputs signals which vary periodically in accordance with the rotational angle of the horizontal shaft (rotational member) 23 upon rotation thereof. Only the first magnetic sensor 541 will be explained below.

The magnetic drum 53 is provided on its outer peripheral surface with a multipolar magnetization layer 53a having T magnetized sections which are magnetized at an equal pitch (T represents the dividing number and is a positive integer). It is assumed that the pitch of the poles (distance between the boundaries of the poles) of the multipolar magnetization layer 53a is λ. The first magnetic sensor (detection device) 541 is opposed to and spaced from the multipolar magnetization layer 53a at a predetermined distance. The first magnetic sensor 541 includes a planar substrate 541a, and eight magnetoresistor elements 4a1, 4b1, 4a2, 4b2, 4a3, 4b3, 4a4, 4b4 spaced at a distance of λ/4 and provided on the surface of the planar substrate 541a opposed to the multipolar magnetization layer 53a. The first magnetic sensor 541 is located so that a normal line (with respect to the surface of the magnetization layer 53a) at the median point of each of the magnetoresistor element 4a1 through 4a4 and 4b1 through 4b4 passes the center of rotation of the magnetic drum 53.

In the magnetic incremental encoder 51, when the magnetic drum 53 rotates, the reluctance of the magnetoresistor elements 4a1 through 4a4, 4b1 through 4b4 varies depending on a change of the magnetic field 3 produced by the multipolar magnetization layer 53a, so that the angular displacement of the magnetic drum 53 can be detected at pitches of λ/4, based on the variation of the reluctance. An angle smaller than that corresponding to λ/4 is calculated by interpolation.

Figure 3:
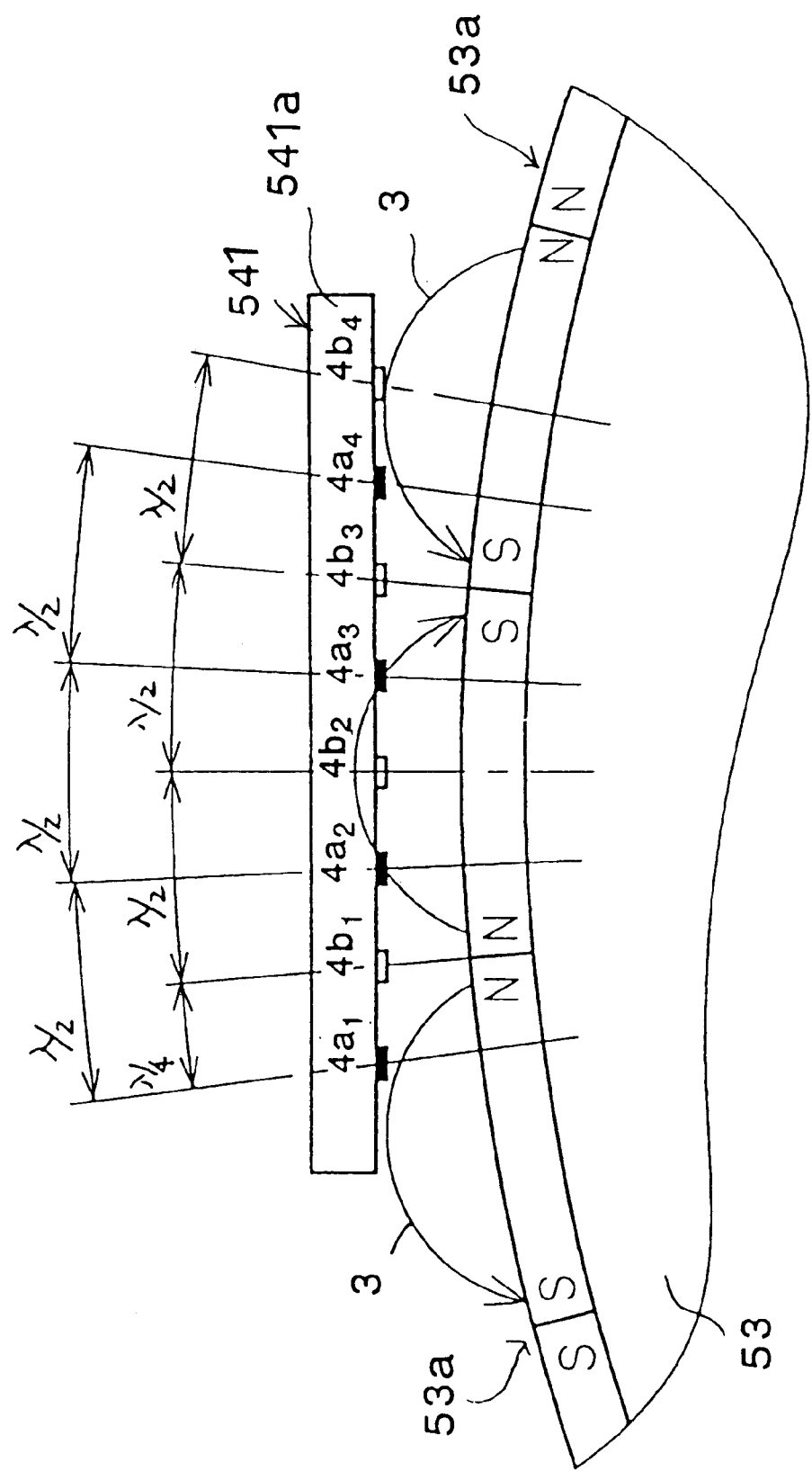
FIG. 3 is an enlarged view showing a relationship between a magnetic drum and magnetic sensors of a magnetic incremental encoder shown in FIG. 1.

The eight magnetoresistor elements 4a1, 4b1, 4a2, 4b2, 4a3, 4b3, 4a4 and 4b4 are classified into phase "A" consisting of the four magnetoresistor elements 4a1 through 4a4 and phase "B" consisting of the four magnetoresistor elements 4b1 through 4b4, as can be seen in FIG. 3. The magnetoresistor elements 4a1 through 4a4 of phase "A" and the magnetoresistor elements 4b1 through 4b4 of phase "B" are alternately arranged. The equal distance of the adjacent magnetoresistor elements 4a1 through 4a4 of phase "A" is equal to λ/2 and the equal distance of the adjacent magnetoresistor elements 4b1 through 4b4 of phase "B" is equal to λ/2. The distance of the adjacent magnetoresistor elements of the adjacent phases "A" and "B" is equal to λ/4.

Figure 4:
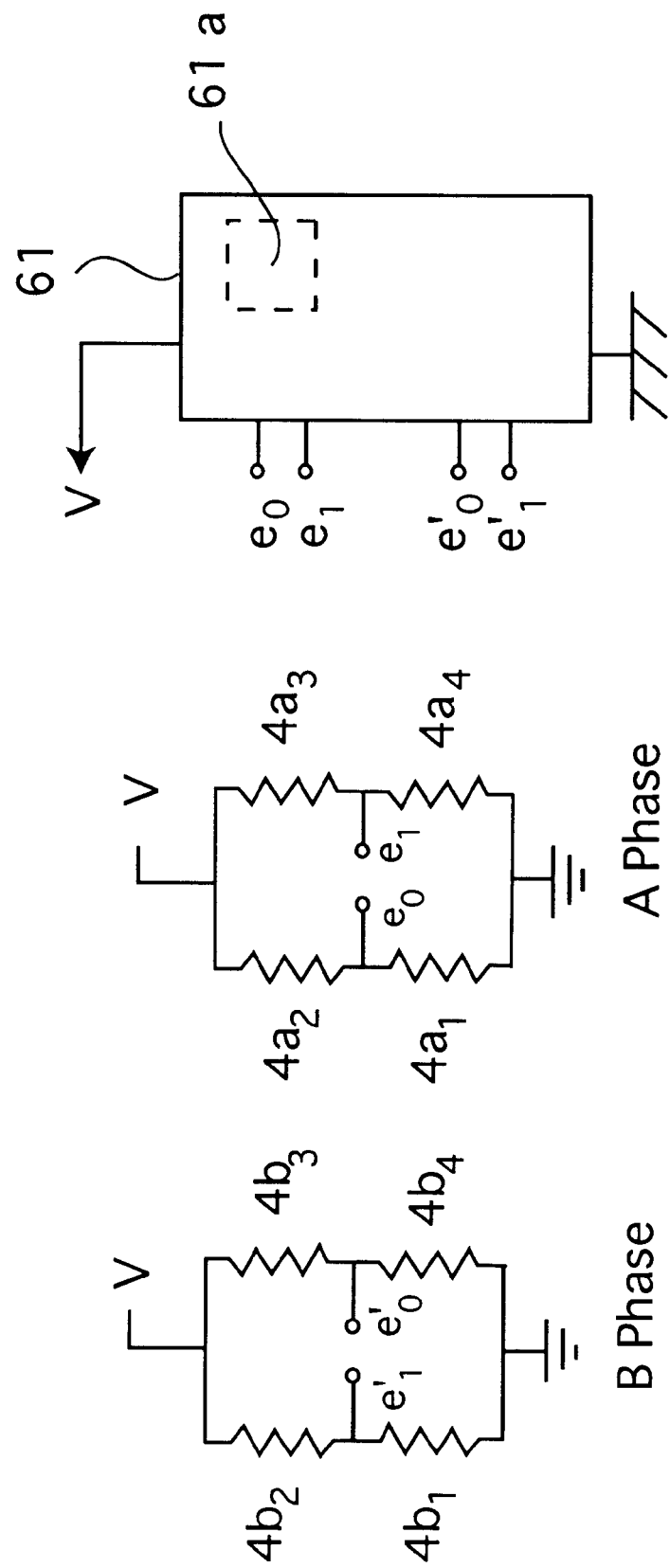
FIG. 4 is a circuit diagram showing a connection of magnetroresistor elements of a magnetic incremental encoder shown in FIG. 1, by way of example.
Figure 5:
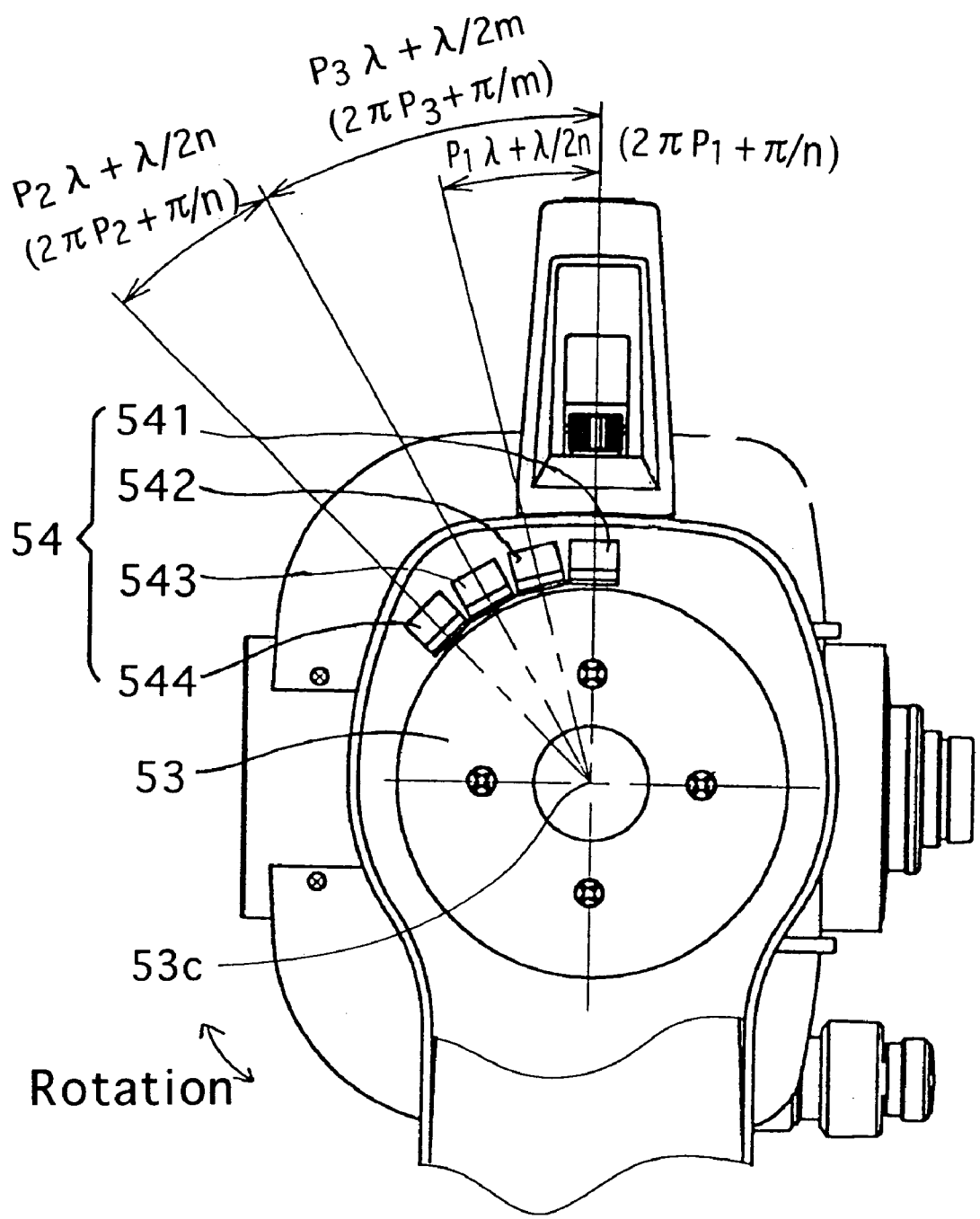
FIG. 5 is a schematic view of first and second magnetic sensors to correct harmonic distortions of $n^{th}$ order and $m^{th}$ order, in a magnetic incremental encoder shown in FIG. 1.

The magnetoresistor elements 4a1 through 4a4 of phase "A" and the magnetoresistor elements 4b1 through 4b4 of phase "B" are bridge-connected as shown in FIG. 4. Namely, the magnetoresistor elements 4a1 and 4a2, which are connected in series, are connected in parallel with respect to the magnetoresistor elements 4a3 and 4a4, which are connected in series. The magnetoresistor elements 4b1 and 4b2, which are connected in series, are connected in parallel with respect to the magnetoresistor elements 4b3 and 4b4, which are connected in series. In phase "A", the magnetoresistor elements 4a1 and 4a2 connected in series, are provided with a terminal e0, and the magnetoresistor elements 4a3 and 4a4, which are connected in series, have a terminal e1. Likewise, in phase "B", the magnetoresistor elements 4b1 and 4b2 connected in series, are provided with a terminal e'1 and the magnetoresistor elements 4b3 and 4b4, which are connected in series, are provided with a terminal e'0. In the electronic circuit 61, a constant voltage V is applied between the bridge-connected magnetoresistor elements, so that a change of the magnetic field can be detected in accordance with a change of the voltage (phase) between the terminals e0 and e1 of phase "A" and the terminals e'0 and e'1 in phase "B" to thereby measure the rotation angle ω of the magnetic drum 53.

According to this illustrated embodiment, the respective resistance values a1, a2, a3 and a4 of the four magnetoresistor elements $4a_1$, $4a_2$, $4a_3$ and $4a_4$ of phase "A" vary in accordance with the variation of the magnetic field 3 generated by the rotation of the magnetic drum 53, in accordance with the following equations:

$$a1=R0+R \sin(T\omega)$$

$$a2=R0+R \sin(T\omega+\pi)=R0-R \sin(T\omega)$$

$$a3=R0+R \sin(T\omega+2\pi)=R0+R \sin(T\omega)$$

$$a4=R0+R \sin(T\omega+3\pi n)=R0-R \sin(T\omega)$$

wherein "ω" designates the rotation angle of the magnetic drum 53, "RO" designates the reluctance at no magnetic field, "R" designates a coefficient (reluctance ratio), and "T" designates the dividing number of the magnetized sections of the multipolar magnetization layer 53a.

Therefore, the output Aout of phase "A" is obtained by the differential amplification of the outputs of the terminals e0 and e1, as follows:

$$Aout=\alpha*R*V/R0*\sin(T\omega)$$

wherein α designates the amplification factor.

Since the magnetoresistor elements 4b1 through 4b4 in phase "B" are deviated by λ/4 from the magnetoresistor elements 4a1 through 4a4 in phase "A", the output Bout of phase "B" is obtained by the differential amplification of the outputs of the terminals e'0 and e'1 , as follows.

$$Bout=\alpha*R*V/R0*\cos(T\omega)$$

Consequently, the rotation angle of the magnetic drum 53 can be detected at 4*T units (360/(4*T) (°) units) by detecting the zero-cross point of the outputs Aout and Bout of the A-phase and the B-phase. Namely, the detection pitch can be reduced to be 4 times the dividing number T, thus resulting in an increased resolving power. In a survey instrument, it is sometimes necessary to detect an angle smaller than (1/T)/4. To this end, the dividing number must be larger than T. In this embodiment, the detection pitch can be reduced by the following interpolation, based on the outputs Aout and Bout of the A-phase and the B-phase to increase the dividing number to thereby enhance the resolving power:

$$\tan^{-1} (Aout/Bout).$$

The above discussion has been addressed to one magnetic sensor (first magnetic sensor 541) in the magnetic sensor unit (54). However, in the present invention, the structure of the magnetic sensor is not limited to that of the illustrated embodiment. The entire structure of the magnetic sensor unit 54 will be discussed below. FIG. 5 shows a total station having a magnetic incremental encoder according to the present invention, in which the dustproof cover 34 is removed to show the front surface of the internal magnetic incremental encoder. The magnetic sensor unit 54 in the illustrated embodiment is provided with four magnetic sensors (first, second, third, and fourth magnetic sensors) 541, 542, 543 and 544.

It is assumed that the output signal of the first magnetic sensor 541 has $n^{th}$ order harmonic distortion. A scale error (angle measurement error) $\epsilon$ due to the harmonic distortion of the output signal of the first magnetic sensor 541 is given by:

$$\epsilon = \delta_1 * \sin(T\omega) + \delta_2 * \sin(2T\omega) + \ldots + \delta_n * \sin(n\, T\omega) + \ldots$$

wherein $\omega$ represents the angle of the protractor plate, $\delta_n$ represents the $n^{th}$ order harmonic distortion, T represents the dividing number of the magnetized sections of the multipolar magnetization layer 53a (dividing number of the protractor plate).

In the illustrated embodiment, to correct the $n^{th}$ order harmonic distortion, the second magnetic sensor (detection device) 542 has a deviation in phase with respect to the first magnetic sensor 541 by $P_1\lambda + \lambda/2n (= 2\pi P_1 + \pi/n)$, wherein $P_1$ designates a positive integer. The scale error component $\epsilon'$ due to the harmonic distortion of the second magnetic sensor 542 is given by:

$$\varepsilon' = \delta_1 * \sin(T(\omega + 2\pi P_1/T + \pi/Tn)) +$$
$$\delta_2 * \sin(2T(\omega + 2\pi P_1/T + \pi/Tn)) + \ldots +$$
$$\delta_n * \sin(nT(\omega + 2\pi P_1/T + \pi/Tn)) + \ldots$$
$$= \delta_1 * \sin(T\omega + \pi/n) + \delta_2 * \sin(2T\omega + 2\pi/n) + \ldots -$$
$$\delta_n * \sin(nT\omega) + \ldots$$

The arithmetic mean of the scale errors $\epsilon$ and $\epsilon'$ of the first and second magnetic sensors 541 and 542 is determined as:

$$(\varepsilon + \varepsilon')/2 = (\delta_1 * (\sin(T\omega) + \sin(T\omega + \pi/n)) +$$
$$\delta_2 * (\sin(2T\omega) + \sin(2T\omega + 2\pi/n)) + \ldots +$$
$$\delta_n * (\sin(nT\omega) - \sin(nT\omega)) + \ldots)/2$$
$$= (\delta_1 * (\sin(T\omega) + \sin(T\omega + \pi/n)) +$$
$$\delta_2 * (\sin(2T\omega) + \sin(2T\omega + 2\pi/n)) + \ldots +$$
$$\delta_2 * (\sin((n-1)T\omega) + \sin((n-1)T\omega +$$
$$(n-1)\pi/n)) + \delta_2 * (\sin((n+1)T\omega) +$$
$$\sin((n+1)T\omega + (n+1)\pi/n)) + \ldots)/2$$

Thus, the $n^{th}$ order harmonic distortion can be corrected.

In the illustrated embodiment, in the case that k order harmonic distortions are corrected, $2^k$ magnetic sensors are used. To correct, for example, two different $n^{th}$ and $m^{th}$ order harmonic distortions, the number of magnetic sensor which are used is equal to $2^k = 2^2 = 4$. In the illustrated embodiment, two kinds of $n^{th}$ and $m^{th}$ order harmonic distortions are corrected.

In this embodiment, a first set of first and second magnetic sensors 541 and 542 and a second set of third and fourth magnetic sensors (detection devices) 543 and 544 are used. The third and fourth magnetic sensors 543 and 544 are deviated by $P_2\lambda + \lambda/2n (= 2\pi P_2 + \pi/n)$, similar to the deviation between the first and second magnetic sensors 541 and 542. Consequently, the $n^{th}$ order harmonic distortions of the output signals of the magnetic sensors 541 through 544 are corrected. Note that $P_2$ is an arbitrary integer and the value of $P_2$ in each set can be identical.

The two sets of magnetic sensors 541, 542 and 543, 544 whose output signals have been subject to correction of the $n^{th}$ order harmonic distortion are deviated from one another by a distance (phase) of $P_3\lambda + \lambda/2m (= 2\pi P_3 + \pi/m)$, wherein $P_3$ is a positive integer. Consequently, the $m^{th}$ order harmonic distortions can be corrected, based on an arithmetic mean of the output signals of the two sets of magnetic sensors 541 through 544. Namely, $n^{th}$ order and $m^{th}$ order harmonic distortions can be corrected at one time. In the illustrated embodiment, there is a phase difference of $P_3\lambda + \lambda/2m$ $(= 2\pi P_3 + \pi/m)$ between the first magnetic sensor 541 and the third magnetic sensor 543. The values of n and m are arbitrary, and can be n<m or n>m.

The measurement of the angles using the collimating telescope of the total station constructed as above is carried out as follows.

When rotation of the magnetic drum 53 takes place, signals are output from the magnetic sensors 541 through 544, in accordance with a change of the magnetic field 3. The detection operation such as detection of the zero-cross point and calculation such as an interpolation calculation are carried out based on the outputs Aout and Bout of the A-phase and the B-phase of the magnetroresistor elements of the magnetic sensors 541 through 544. Consequently, the rotation angles $\omega 1$, $\omega 2$, $\omega 3$ and $\omega 4$ are calculated based on the output signals of the magnetic sensors 541 through 544. The arithmetic mean of the rotation angles $\omega 1$, $\omega 2$, $\omega 3$ and $\omega 4$ thus obtained is calculated as follows;

$$\omega = (\omega 1 + \omega 2 + \omega 3 + \omega 4)/4$$

Consequently, accurate rotation angles $\omega$ whose $n^{th}$ and $m^{th}$ order harmonic distortions have been corrected can be obtained.

As can be understood from the above discussion, according to the embodiment of the present invention, a set of magnetic sensors are provided, including two magnetic sensors which are spaced from one another so that there is a detection phase difference of $\pi/n$ therebetween, to correct $n^{th}$ order harmonic distortions. To correct $m^{th}$ order harmonic distortions, two sets of magnetic sensors, each set being arranged as described above, are spaced at a distance so that there is a detection phase difference of $\pi/m$ therebetween. Thus, $n^{th}$ order and $m^{th}$ order harmonic distortions can be corrected. The arithmetic mean of the rotation angles detected by the magnetic sensors makes it possible to obtain an accurate rotation angle whose $n^{th}$ and $m^{th}$ harmonic distortions have been corrected.

Although not shown in the drawings, it is possible to attach at least one set of magnetic sensors, for example, the third and fourth magnetic sensors 543 and 544 to a base plate which is rotatable about the shaft 53c, so that the magnetic sensors are movable about the shaft 53c, in order to correct the harmonic distortion of any order other than the $n^{th}$ order, by adjusting the distance (phase) of the first and second magnetic sensors 541 and 542. In other words, it is possible to vary the order of the harmonic distortion to be corrected.

In a conventional survey instrument, the fine detection precision or error of the magnetic incremental encoder can be discovered only after it is machined, and there is a possibility that a harmonic distortion of an order other than that estimated upon design. According to the present invention, even if such a harmonic distortion of the unexpected order occurs, the same can be corrected by adjusting the distance between the first through fourth magnetic sensors 541 through 544. Namely, according to the present invention, it is possible to enhance the precision of the detection by the adjustment of the position of the magnetic sensors, without machining the magnetic sensors again. Moreover, the time and cost of the adjustment operation can be reduced.

Figure 6:
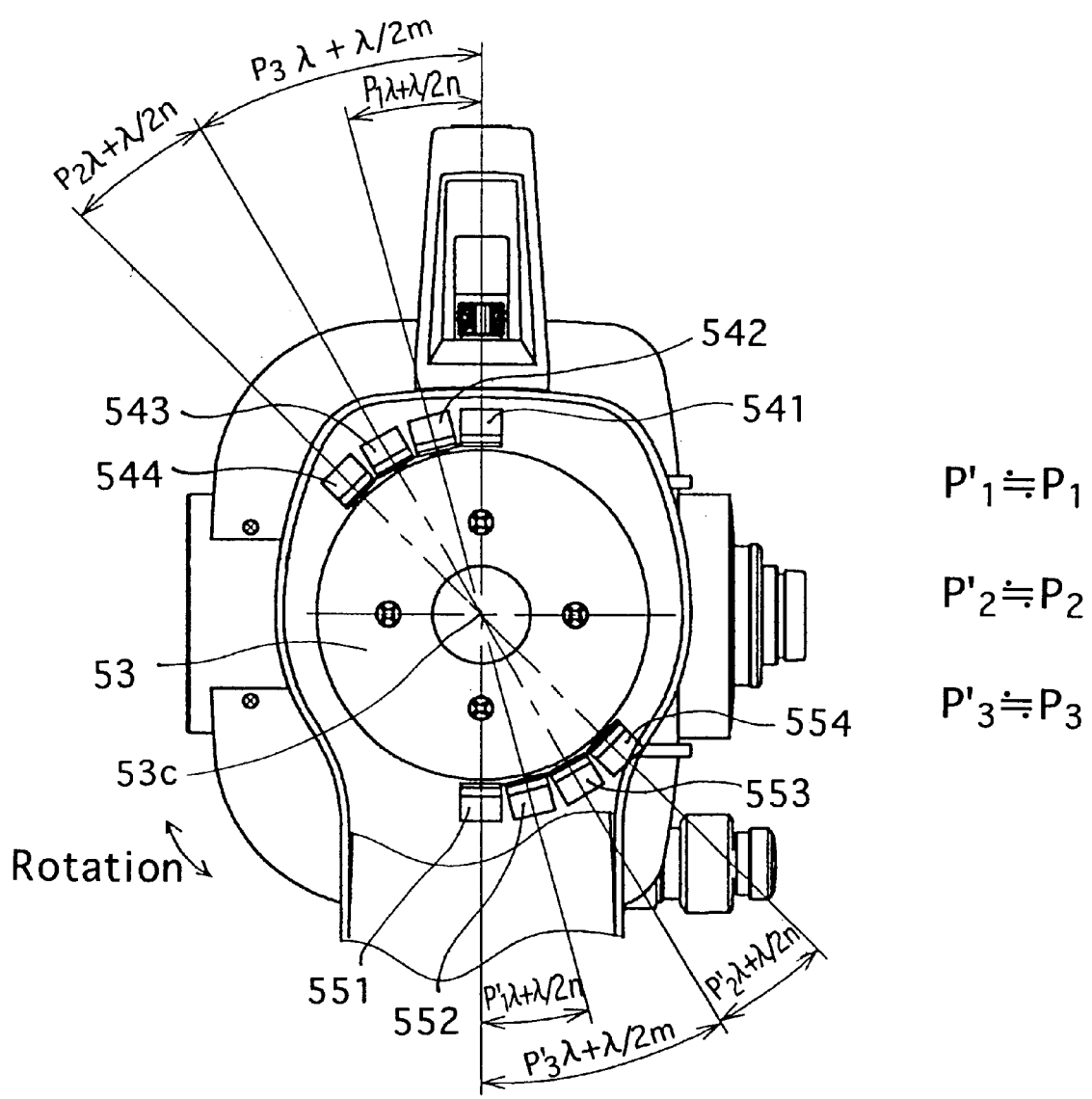
FIG. 6 is a schematic view of first and second magnetic sensors to correct harmonic distortions of $n^{th}$ order and $m^{th}$ order and deviation, in a magnetic incremental encoder shown in FIG. 1.

The deviation tolerance of the protractor plate in a survey instrument is specified by JIS (Japanese Industrial Standard) regulations, etc. To correct the deviation, a magnetic sensor can be arranged at a position diametrically (180°) opposed to each of magnetic sensor so as to satisfy the requirements of the geometrical arrangement to provide the phase difference mentioned above. FIG. 6 shows an example of the geometrical arrangement. In this embodiment (second embodiment), the deviation and the $n^{th}$ order and $m^{th}$ order harmonic distortions are corrected simultaneously, based on the detection values of the two magnetic sensor units 54 and 55 which are diametrically (180°) opposed to each other.

In the second embodiment shown in FIG. 6, four magnetic sensors (detection devices) 551, 552, 553 and 554 whose construction is the same as the magnetic sensors 541 through 544 are diametrically opposed to the magnetic sensors 541 through 544 around the magnetic drum 53 with respect to the axis of rotation 53c thereof, so that there is a phase difference of approximately 180° therebetween. With this arrangement, the rotation angle whose $n^{th}$ order and $m^{th}$ order harmonic distortions and deviation have been corrected can be obtained, using the arithmetic mean of the rotation angles obtained by the magnetic sensor units 54 and 55.

The above discussion has been addressed to correction of the harmonic distortions of two different orders. To correct the harmonic distortions of k different orders, $2^k$ magnetic sensors are arranged and deviated at every two magnetic sensors by a phase difference obtained, based on one of j order of the number of k orders, using the formula: $2\pi P + \pi/j$ (P is an arbitrary integer). Every two magnetic sensors constitute one set. The magnetic sensors of each set are deviated by a phase difference determined, based on another order using the formula mentioned above. The two sets arranged as above constitute one group in which magnetic sensors are arranged and deviated by a phase difference determined based on one of the remaining orders, using the formula mentioned above. Consequently, the harmonic distortions of k different orders can be corrected.

In other words, the two magnetic sensors are arranged in accordance with the value of the order of the harmonic distortion to be corrected.

As can be understood from the foregoing, according to the embodiment of the present invention, it is possible to correct a plurality of harmonic distortions in a magnetic incremental encoder in which an increase of the dividing number of the magnetized sections of the multipolar magnetization layer 53a of the magnetic drum 53 is restricted, thus resulting in the magnetic incremental encoder having a high detection precision. Moreover, since the distance (phase) between the magnetic sensors can be adjusted, it is possible to correct the harmonic distortion of an order which was not expected upon the design stage. Furthermore, since the number of the elements within the magnetic sensors can be reduced, it is possible to make each magnetic sensor small. Consequently, the measurement error caused by the non-uniformity of the distance between the sensor elements of the planar magnetic sensor and the curved surface of the magnetic drum, can be reduced, thus leading to accurate measurement.

As can be understood from the above discussion, according to the present invention, $2^k$ detectors are provided to correct k different order harmonic distortions, and every two detectors are deviated corresponding to the value of the orders of the harmonic distortions to be corrected. Accordingly, it is possible to enhance the measurement precision of the magnetic incremental encoder in which the dividing number of the magnetized sections is limited.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A magnetic incremental encoder comprising a plurality of detection devices which are provided on an outer periphery of a rotational member at a predetermined phase difference, wherein each of said detection devices outputs signals which vary periodically in accordance with the rotational angle of said rotational member upon rotation thereof;

wherein said plurality of detection devices are provided in sets of two detection devices on the outer periphery of said rotational member, wherein a phase difference between one of said sets of two detection devices and an adjacent another of said sets of two detection devices is determined according to the following formula:

$2\pi P + \pi/j$; wherein

P designates an arbitrary integer; j designates one of a number of k orders, wherein k designates the number of orders of harmonic distortions to be corrected; and wherein the number of said plurality of detection devices is equal to $2^k$.

2. The magnetic incremental encoder according to claim 1, further comprising a calculation device which calculates an arithmetic mean of the detection signals of said plurality of detection devices to obtain a detection angle whose harmonic distortions of k order have been corrected.

3. The magnetic incremental encoder according to claim 1, wherein in order to correct k number of different order harmonic distortions, the phase difference between one of said sets of two detection devices and an adjacent another of said sets of two detection devices is determined by said formula at a first order of j order of the number of k orders;

wherein said one of said sets of two detection devices and said adjacent another of said sets of two detection devices constitute a group of detection devices.

4. The magnetic incremental encoder according to claim 3, wherein the phase difference between one group of detection devices and an adjacent another group of detection devices of said plurality of detection devices is obtained by said formula at a j order other than said first order, of the number of k orders.

5. The magnetic incremental encoder according to claim 1, wherein in order to correct $n^{th}$ order and $m^{th}$ order harmonic distortions, two sets of detection devices are provided; each set of detection devices comprising two detection devices, each detection device of said two sets of detection devices being arranged with a phase difference determined by one of the following formulae:

$2\pi P_1 + \pi/n$; and $2\pi P_2 + \pi/n$;

wherein $P_1$ and $P_2$ are arbitrary integers; and wherein the each set of detection devices are arranged with a phase difference determined by the following formula:

$2\pi P_3 + \pi/m$;

wherein $P_3$ is an arbitrary integer.

6. The magnetic incremental encoder according to claim 1, wherein said rotary member is rotatably supported by a stationary portion of a device on which the magnetic incremental encoder is mounted, and said rotary member being a magnetic drum which is provided on the outer peripheral surface thereof with a multipolar magnetization layer having split sections magnetized at an equal pitch of $\lambda$;

said detection devices being provided with magnetic sensors mounted to the stationary portion and opposed to the multipolar magnetization layer of said magnetic drum.

7. The magnetic incremental encoder according to claim 6, wherein said magnetic sensors are each provided with eight magnetroresistor elements arranged with a phase difference of $\lambda/4$ to detect the magnetic field which varies in accordance with the rotation of said magnetic drum; and wherein a detection signal is produced in accordance with the rotation angle of said magnetic drum, based on the detection outputs of four magnetroresistor elements which are deviated by $\lambda/2$ and the detection outputs of the remaining four magnetroresistor elements which are deviated by $\lambda/2$.

8. The magnetic incremental encoder according to claim 6, wherein said calculation device calculates the arithmetic mean of the rotation angles detected by all said magnetic sensors to obtain a rotation angle of said magnetic drum.

9. The magnetic incremental encoder according to claim 1, wherein additional detection devices, which have the same arrangement and number as said plurality of detection devices, are provided diametrically and symmetrically opposed to said plurality of detection devices, with respect to the center of rotation of said rotational member.

10. A survey instrument having a magnetic incremental encoder comprising a plurality of detection devices which are provided on an outer periphery of a rotational member at a predetermined phase difference, wherein each of said detection devices outputs signals which vary periodically in accordance with the rotational angle of said rotational member upon rotation thereof;

wherein said plurality of detection devices are provided in sets of two detection devices on the outer periphery of said rotational member, wherein a phase difference between one of said sets of two detection devices and an adjacent another of said sets of two detection devices is determined according to the following formula:

$$2\pi P + \pi/j; \text{ wherein}$$

P designates an arbitrary integer; and j designates one of the number of k orders, wherein k designates the number of orders of harmonic distortions to be corrected;

wherein the number of said plurality of detection devices is equal to $2^k$; and wherein said magnetic incremental encoder constitutes at least one of a vertical and horizontal protractor.

* * * * *